United States Patent [19]

Sichler

[11] Patent Number: 4,770,442
[45] Date of Patent: Sep. 13, 1988

[54] ELECTROWELD FITTING OR ELECTROWELD COLLAR

[75] Inventor: Wolfgang Sichler, Mannheim, Fed. Rep. of Germany

[73] Assignee: Friedrichsfeld GmbH, Keramikund Kunststoffwerke, Mannheim, Fed. Rep. of Germany

[21] Appl. No.: 929,290

[22] Filed: Nov. 12, 1986

[30] Foreign Application Priority Data

Nov. 13, 1985 [DE] Fed. Rep. of Germany ....... 3540193

[51] Int. Cl.⁴ .............................................. F16L 47/02
[52] U.S. Cl. ..................................... 285/21; 285/906; 219/535; 156/273.9
[58] Field of Search ................... 285/21, 22, 292, 406, 285/293, 423; 156/294, 273.5, 304.6, 273.9, 304.2; 219/535, 544

[56] References Cited

U.S. PATENT DOCUMENTS

| | | | |
|---|---|---|---|
| 2,198,996 | 4/1940 | Guarnaschelli | 285/45 X |
| 2,963,394 | 12/1960 | Wilkinson | 285/21 X |
| 3,519,023 | 7/1970 | Burns et al. | 219/535 X |
| 3,558,164 | 1/1971 | Havell | 285/423 X |
| 4,176,274 | 11/1979 | Lippeva | 219/544 X |
| 4,257,630 | 3/1981 | Bartell et al. | 285/21 |
| 4,398,754 | 8/1983 | Caroleo | 285/423 X |
| 4,449,038 | 5/1984 | Reich et al. | 285/21 X |
| 4,508,368 | 4/1985 | Blumenkranz | 285/21 |
| 4,530,520 | 7/1985 | Nyffeler | 285/21 |
| 4,602,148 | 7/1986 | Ramsey | 156/273.9 |
| 4,626,308 | 12/1986 | Ansell | 285/21 X |

FOREIGN PATENT DOCUMENTS

| | | | |
|---|---|---|---|
| 1416207 | 9/1965 | France | 285/21 |
| 2522389 | 3/1983 | France . | |
| 6412575 | 5/1966 | Netherlands . | |
| 6601024 | 7/1967 | Netherlands . | |
| 1107346 | 8/1984 | U.S.S.R. | 219/544 |

Primary Examiner—Dave W. Arola
Attorney, Agent, or Firm—Foley & Lardner, Schwartz, Jeffery, Schwaab, Mack, Blumenthal & Evans

[57] ABSTRACT

An electroweld fitting or electroweld collar for synthetic resin pipes comprising a body of a thermoplastic and/or weldable synthetic resin, on the inner surface of which a heating coil is arranged. In order to weld an electric current is conducted to the heating coil, whereby the material of the body is strongly heated and becomes plastic. The invention solves the problem of reliably applying the contact pressure in the welding zone while using a reduced amount of material. To achieve this it is proposed that a reinforcement in the form of a winding or a tube be arranged on the outer surface of the body and that the thermal coefficient of expansion of the reinforcement be smaller than that of the body.

22 Claims, 2 Drawing Sheets

ELECTROWELD FITTING OR ELECTROWELD COLLAR

BACKGROUND OF THE INVENTION

The invention relates to an electroweld fitting or an electroweld collar for pipes having a body of a thermoplastic and/or weldable material, particularly a polyolefin such as polyethylene, with a heating wire arranged adjacent an inner surface, preferably wound into a helical heating coil, to which current can be passed for welding.

West German published application DE-AS No. 28 23 455 discloses an electroweld collar of thermoplastic synthetic resin provided with a helical heating coil in the vicinity of its inner surface. In order to weld, the wires of the helical heating coil are connected with a source of current in order to conduct the requisite welding current to the helical heating coil. During welding, the surrounding material becomes plastic due to the heating of the helical heating coil.

To assure a good weld, a sufficient pressure between the surfaces to be joined must be maintained during the welding. This has hitherto been effected by forming the wall thickness of the synthetic resin body of the welding collar or welding fitting appropriately thick. Thereby it is achieved that, in accordance with the thermal gradients, the radially outer portions of the body are only warmed a little and remain substantially solid and rigid. The warmed plastic material in the interior in the vicinity of the helical heating coil thus cannot flow out. Because of the thus relatively large wall thickness of the weld fitting or weld collar, a large amount of material was required. Further, the weight and volume thereby became large, which was disadvantageous with regard to handling, transport costs, storage, etc.

SUMMARY OF THE INVENTION

It is the object of the invention to further develop a weld fitting or weld collar of the aforementioned type in such a way that the pressing force can be applied during welding although a reduced amount of material is used.

These objects are achieved by providing an electroweld fitting having a body of weldable material with a heating wire arranged on an inner surface to which current may be passed for welding, wherein a reinforcement is arranged on the outer surface of said body, and wherein the coefficient of thermal expansion of the reinforcement is smaller than the coefficient of thermal expansion of the body.

By means of the reinforcement arranged on the outside, an increase in strength is assured in a simple manner so that the material thickness of the weld collar or weld fitting can be significantly reduced in comparison with known arrangements. Because of the reduced wall thickness of the body in accordance with the invention, a relatively strong warming effect may occur at the outer surface during welding, however, because of the outer reinforcement, any expansion in the radially outward direction is avoided. Especially in large collars for pipes with large diameters, a reduction in the wall thickness of the collar body is of particular importance because of the saving in the amount of synthetic resin material. The increase in volume which occurs during welding resulting from the warming of the body effects a reduction in the size of the inner diameter of collar bodies or fitting bodies and produces the desired pressing force in the welding zone. The plastic material in the inner region warmed by the helical heating coil during welding can experience practically no increase in volume in the radially outward direction since the reinforcement simultaneously forms a rigid jacket because of the small coefficient of thermal expansion in accordance with the invention. Rather, a decrease in size of the internal diameter of the weld collar or weld fitting is achieved by the radially inwardly expanding material, whereby the required pressing force on the pipe which is to be welded is produced in the weld-joint zone. Handling during assembly or during welding is simple since the operating personnel do not need to resort to any supplemental measures. In accordance with the invention, the weld collar or weld fitting can be fabricated at the lowest possible cost from a commercially available pipe, particularly a standard pipe, the inner diameter of which corresponds approximately to the outer diameter of the pipe which is to be connected. The wall thickness of the pipe itself, or also that of the next diameter size, is thoroughly adequate for the collar body or fitting body according to the invention, and special manufactures, particular forms, and the like, can be dispensed with.

One particular embodiment is characterized in that the reinforcement is formed as a winding or coil of a wire, particularly a steel wire. Advantageously, the outer surface of the body is provided with a helical groove in which the aforementioned coil is arranged and secured. The coil or reinforcement is disposed in the helical groove and anchored so that an increase in size of the coil, as a result of the expansion of the body of thermoplastic synthetic resin during welding, is reliably prevented. The coil is solidly embedded in the helical groove so that any outward give during welding is avoided in accordance with the invention. Because of the arrangement in the groove and the resulting frictional holding force, the coil is prevented from becoming loose and/or spreading in size. The ends of the coil do not need to necessarily be anchored or otherwise connected to each other because, due to the aforementioned friction between the winding and the coil, a reliable fixing of the coil is assured. It is also significant that exact dimensional specifications of the outer surface do not need to be observed and large tolerances can be accepted, since the coil is wound on the outer surface in a quasiendless process. The cost advantages achieved hereby are apparent. The extruded pipe of the next nominal size is merely cut to the required length, and the coil is subsequently applied directly to the outer surface. Special end attachments and anchors for the wire ends are not required.

In one specific embodiment, the windings of the wire are spaced apart from each other in the longitudinal direction a distance which is at least equal in size to the diameter of the wire. This assures that during welding, on the one hand the projections of material which are located between the windings will assure a reliable anchoring of the winding, and on the other hand the contact force will become too small due to too large of spacing.

In a further embodiment the ends of the winding or coil terminate in a bore, particularly in the control bore of the weld collar or weld fitting. Any unintentional pulling out of the ends of the coil during transportation or storage is thereby prevented in a simple manner. A simple protection against an increase in width during welding is assured.

In significant alternative embodiments the reinforcement can be formed as a tube or pipe which remains on the collar or also as a plurality of reusable supporting shells. The important thing in all embodiments is that the reinforcement have a thermal coefficient of expansion which is lower by a predetermined factor than the coefficient of expansion of the body. It is advantageous to provide a coefficient of expansion of the reinforcement which is smaller by at least a factor of 5, preferably by at least a factor of 10. The reinforcement may particularly be made of metal, whether in the form of a wire coil or of a metal tube. Embodiments in which the reinforcement is formed of fiber reinforced synthetic resin, which is either pressed as a prefabricated tube onto the body of the collar or fitting or is built up as a laminate directly on the body of the collar or fitting and thereafter cured, are also within the scope of the invention. In this invention the length of the reinforcement is at least equal in length to the length of the welding zone of the heating coil or heating spiral which is arranged in the interior. On the other hand the maximum length of the reinforcement of the invention is at most only as large as the length of the collar or fitting.

BRIEF DESCRIPTION OF THE DRAWINGS

The invention will be explained hereinafter in further detail with reference to a working embodiment illustrated in the drawings.

DETAILED DESCRIPTION OF PREFERRED EMBODIMENTS

Figure 1:
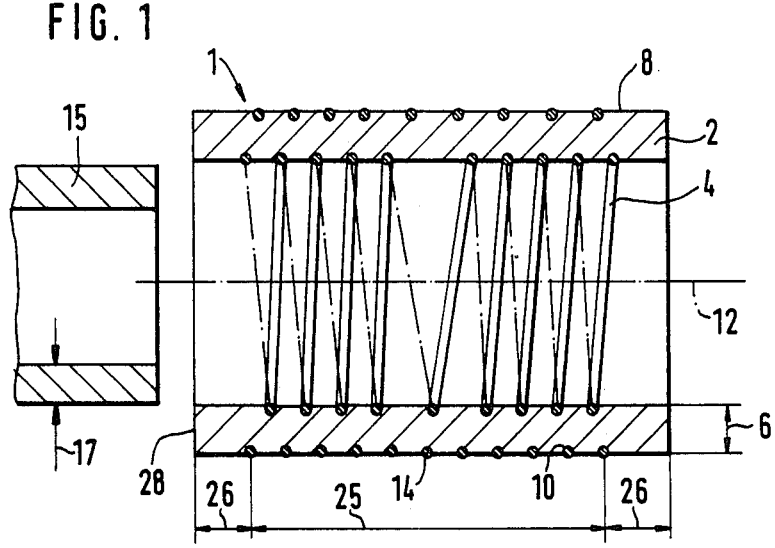
FIG. 1 shows a longitudinal sectional view through a weld fitting.

FIG. 1 shows a longitudinal section through a weld fitting 1 having a body 2, on the inner surface of which a heating coil 4 is arranged in a known manner. The wall thickness 6 of the body 2 is comparatively small. The outer surface 8 of the substantially cylindrical body 2 is provided with a helical form groove 10, which winds around the longitudinal axis 12. A coil or winding 14 is embedded in this groove 10. The winding 14 is inserted in the groove 10 by a so-called endless process, whereby relatively large variations are permissible with respect to dimensional tolerances, roundness as well as diameter tolerances. Special anchor means for the two wire ends 16 are optional. The weld collar is further provided with a bushing 21 with a contact coil 19 through which the supply of current to the heating coil 4 takes place. The contact coil 19 is formed at the end of the wire of heating coil 4. A further bushing with a contact coil is correspondingly provided at the other end of the collar or welding fitting.

The winding 14 which forms the outer reinforcement has a length 25 which in accordance with the invention is at least equal in size to the axial length of the heating coil 4. The ends of the coil 14 have a spacing 26 with respect to the end surface 28 of the collar body 2. As a result of this spacing the amount of material required for the reinforcement can be kept small. What is important is that the welding zone or the heating coil 4 be radially outwardly surrounded by the reinforcement and a radially outward displacement of the material is prevented. The inner diameter of the collar body 2 corresponds substantially to the outer diameter of the pipe 15 which is to be welded. Because of the reinforcement provided in accordance with the invention, the wall thickness 6 of the body 2 is substantially equal to or only a few percent larger than the wall thickness 17 of pipe 15. In accordance with the invention, the wall thickness 6 of body 2 is at most 10 percent, advantageously at most 5 percent, greater than the wall thickness 17 of the pipe 15 which is to be connected. Corresponding to the end of pipe 15 which is shown at the left of the drawing, an end of a second pipe can also be inserted into the weld fitting 1 from the other side, i.e., from the right of the drawing, which is to be connected to pipe 15 by means of the weld fitting.

Figure 2:
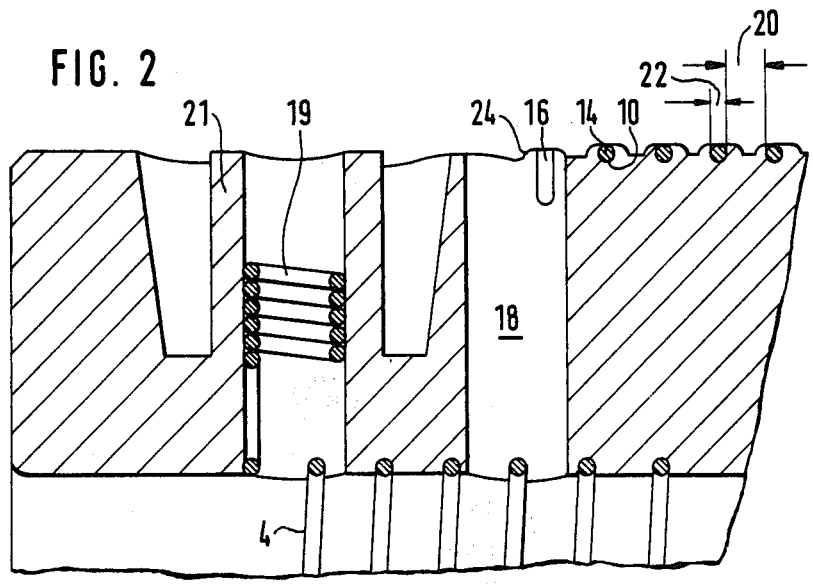
FIG. 2 shows an enlarged sectional view of the coil in the vicinity of the end of the weld collar.

FIG. 2 shows an enlarged sectional view of a weld collar in which the wire end 16 can be seen bent into a control bore 18. This weld collar may be a part of a weld fitting in which, as explained with reference to FIG. 1, two or more such collars are provided. Further, within the scope of the invention, the weld collar may also be arranged at the end of a pipe, a Y-branch, a tee, an armature or the like. The wire end 16 is pushed somewhat inward in the control bore 18 in order to prevent it from being pulled out unintentionally during transport or at the construction site. The individual windings of the coil 14 have a spacing 20 in the direction of the longitudinal axis which is at least as large as the diameter 22 of the wire of the coil. The coil, that is to say the wire, is inserted in the helical-form groove 10 in a continuous process. The groove 10 is cut into the outer surface with a knife, whereby accumulations of material 24 are produced at the sides. The wire or coil is inserted immediately thereafter, and the material accumulations 24 are pressed over the inserted wire by means of pressure rolls or the like. A better anchoring of the coil in the outer surface 8 is thereby assured. In FIG. 2 the control bore 18 with the wire end 16 is arranged spaced in the axial direction from the end of the heating coil 4 only for reasons of simplicity. The control opening 18 or the wire end 16 of the coil 14 can, within the scope of the invention, be arranged such that, as explained above with reference to FIG. 1, the coil 14 has at least the same axial length as the heating coil 4.

Figure 3:
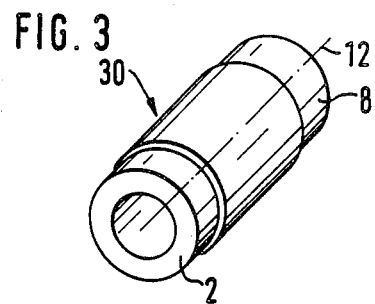
FIGS. 3 through 8 shows embodiments of the tubular reinforcement made of a metallic material.

In the drawing figures to be explained hereinafter, advantageous embodiments of the reinforcement on the synthetic resin collar body are schematically illustrated. In accordance with FIG. 3, the reinforcement is formed as a tube 30, which is pressed onto the outer surface 8 of the collar body 2. A seamlessly produced metallic tube or a metallic tube with a welded longitudinal seam may be used. The tube is arranged in accordance with the invention with a press fit on the outer surface of the body 2. For this purpose, the body is cooled during assembly, whereby the diameter of the body 2 becomes smaller and the tube can be slipped on without any difficulty. Alternatively within the scope of the invention, the tube 30 can also be heated before assembly so that a press fit is achieved as a result of the subsequent cooling of the tube.

Figure 4:
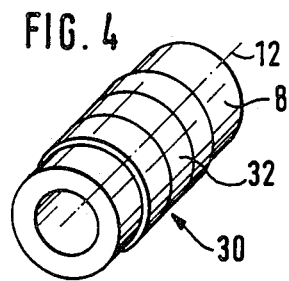

In the embodiment according to FIG. 4, the tube arranged on the outer surface 8 comprises three closed ring pieces 32 which are pushed onto the body 2. The assembly takes place in accordance with the foregoing explanation after cooling of the body 2 or warming of the ring pieces 32.

Figure 5:
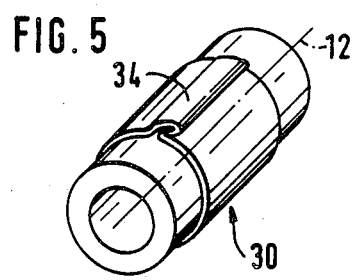

In accordance with FIG. 5, the reinforcement comprises a tube 30 which is rolled from a sheet of metal and has a flanged or turned back seam 34 parallel to the longitudinal axis 12.

Figure 6:
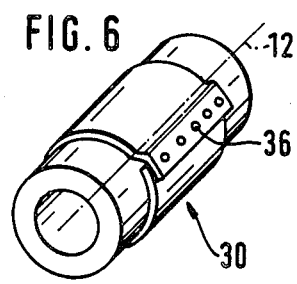

In accordance with FIG. 6, a tube 30 rolled from a sheet of metal is pressed on the outer surface of the body 2, the longitudinal edges of which overlap and are connected to each other by means of spot welds 36. The preassembly of this tube 30 takes place by means of a combined rolling/stressing device so that during the spot welding the required prestressing of the reinforcing sheet or tube is assured.

Figure 7:
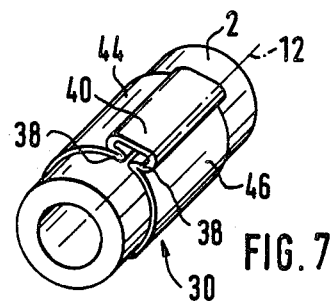

In the embodiment according to FIG. 7, the tube 30 is formed from a rolled sheet of metal which has flanges (sicken) 38 on its two adjacent longitudinal edges. The connection is effected with a closure piece 40 which engages the flanges 38 with its inwardly bent back ends. The closure piece 40 is slidable parallel to the longitudinal axis 12 in the indicated manner. The tube comprises two half shells 44 and 46 which are connected with a closure piece in a corresponding manner on the back side which is not visible in the drawing. These supporting half shells 44 and 46 are arranged on the fitting body 2 before the welding takes place. After the welding, they can be removed again and be used again with another fitting 2. Within the scope of the invention, instead of the two aforedescribed diametrically opposed closure pieces, only a single closure piece may be provided, whereby in accordance with the embodiments of FIGS. 5 and 6, a rolled sheet of metal is connected along its longitudinal edges with a single closure piece 40.

Figure 8:
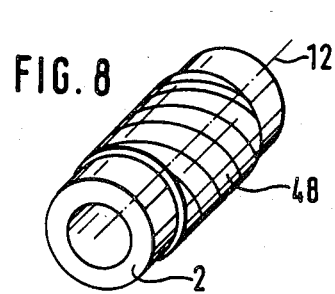

In accordance with FIG. 8 the reinforcement is formed according to the invention as a spiral form strip of sheet metal 48 wound around the collar body 2. The beginning and end of this coil are either mechanically anchored in the collar body or attached to the adjacent windings by welding, for example spot welding.

Figure 9:
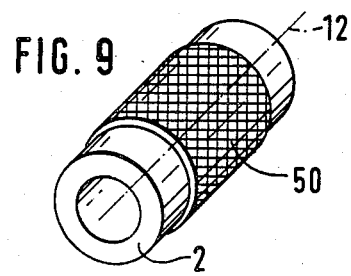
FIGS. 9 and 10 shows embodiments of the reinforcement made of a fiber reinforced synthetic resin.

FIG. 9 shows a significant embodiment in which the reinforcement is formed as a fiber reinforced tube 50 which is pressed onto the body 2. The prefabricated tube 50 in accordance with the invention is made of a fiber reinforced synthetic resin, particularly of a glass fiber reinforced polyester resin, wherein the fibers are arranged with plus/minus 45 degree windings.

Figure 10:
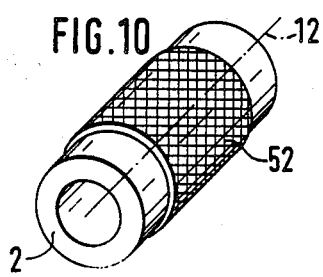

Finally, in FIG. 10 a particular embodiment is illustrated, according to which a laminate 52 of fiber reinforced synthetic resin is wound directly onto the fitting body 2. In particular a glass fiber reinforced synthetic resin which is curable by the action of light or the action of heat, preferably a polyester resin, may be used. Also in this embodiment plus/minus 45 degree windings are advantageously provided.

The foregoing description has been set forth merely to illustrate the invention and is not intended to be limiting. Since modifications of the described embodiments incorporating the spirit and substance of the invention may occur to persons skilled in the art, the scope of the invention should be limited solely with reference to the appended claims and equivalents.

I claim:

1. An electroweld fitting having a body of weldable thermoplastic material with a heating wire arranged on an inner surface to which current may be passed for welding, wherein a reinforcement formed as a single continuous helical wire winding is arranged on the outer surface of said body, and the thermal coefficient of expansion of the reinforcement is smaller than the thermal coefficient of expansion of said body by at least a factor of 5.

2. An electroweld fitting according to claim 1, wherein the thermal coefficient of expansion of the reinforcement is smaller than the thermal coefficient of expansion of said body by at least a factor of 10.

3. An electroweld fitting having a body of weldable thermoplastic material with a heating wire arranged on an inner surface to which current may be passed for welding, wherein a reinforcement formed as a single continuous helical wire winding is arranged on the outer surface of said body, and the wall thickness of said body is at most 10 percent greater than the wall thickness of the pipe to be connected.

4. An electroweld fitting according to claim 3, wherein the wall thickness of said body is at most 5 percent greater than the wall thickness of the pipe to be connected.

5. An electroweld fitting having a body of weldable thermoplastic material with a heating wire arranged on an inner surface to which current may be passed for welding, wherein a reinforcement formed as a single continuous helical wire winding is arranged and secured in a spiral form groove in the outer surface of said body, and lateral accumulations of material are formed when said groove is cut into said body, and said material accumulations are pressed from the outside over the winding wire.

6. An electroweld fitting having a body of weldable thermoplastic material with a heating wire arranged on an inner surface to which current may be passed for welding, wherein a metal reinforcement is permanently arranged on the outer surface of said body so as to be fixed and undisplaceable and remains on the outer surface of said body after completion of the welding operation, and said reinforcement is formed as a tube which is formed from at least two support shells which are permanently connected to each other by means of closure pieces.

7. An electroweld fitting having a body of weldable thermoplastic material with a heating wire arranged on an inner surface to which current may be passed for welding, wherein a metal reinforcement is permanently arranged on the outer surface of said body so as to be fixed and undisplaceable and remains on the outer surface of said body after completion of the welding operation, and said reinforcement is a tube comprising a plurality of ring pieces arranged axially adjacent to each other.

8. An electroweld fitting having a body of weldable thermoplastic material with a heating wire arranged on an inner surface to which current may be passed for welding, wherein a metal reinforcement is permanently arranged on the outer surface of said body so as to be fixed and undisplaceable and remains on the outer surface of said body after completion of the welding operation, and said reinforcement is a tube formed from a coiled strip of sheet metal.

9. An electroweld fitting having a body of weldable thermoplastic material with a heating wire arranged on an inner surface to which current may be passed for welding, wherein a metal reinforcement formed as a tube from a rolled sheet of metal is permanently arranged on the outer surface of said body so as to be fixed and undisplaceable and remains on the outer surface of said body after completion of the welding operation, and said tube is secured together by means of a flanged seam on longitudinal edges of said rolled sheet of metal.

10. An electroweld fitting having a body of weldable thermoplastic material with a heating wire arranged on an inner surface to which current may be passed for welding, wherein a metal reinforcement formed as a tube from a rolled sheet of metal is permanently arranged on the outer surface of said body so as to be fixed and undisplaceable and remains on the outer surface of said body after completion of the welding operation, and said tube is secured together by means of spotwelds along longitudinal edges of said rolled sheet of metal.

11. An electroweld fitting having a body of weldable thermoplastic material with a heating wire arranged on an inner surface to which current may be passed for welding, wherein a helical wire reinforcement winding is arranged on the outer surface of said body, and at least one end of said winding is anchored in a bore which extends from the outer surface of said body inwardly into said body.

12. An electroweld fitting according to claim 11, wherein said thermoplastic material is a polyolefin.

13. An electroweld fitting according to claim 12, wherein said polyolefin is polyethylene.

14. An electroweld fitting according to claim 11, wherein said heating wire is wound to a heating coil.

15. An electroweld fitting according to claim 14, wherein the axial length of the reinforcement is at least as long as the length of the heating coil.

16. An electroweld fitting according to claim 11, wherein the end of the reinforcement is spaced a predetermined distance from an end face of said body.

17. An electroweld fitting according to claim 11, wherein said body has a wall thickness which is substantially equal in size to the wall thickness of a pipe to be connected.

18. An electroweld fitting according to claim 11, wherein said winding is arranged and secured in a spiral form groove in the outer surface of the body.

19. An electroweld fitting according to claim 11, wherein the ends of said winding are bent radially inwardly and anchored in radially extending bores in said body.

20. An electroweld fitting according to claim 11, wherein adjacent turns of said winding are axially spaced from each other a distance which is at least equal to the diameter of the winding wire.

21. An electroweld fitting according to claim 11, wherein the end of said reinforcing wire which extends into said bore is spaced a predetermined distance from an end face of said body.

22. An electroweld fitting according to claim 11, wherein said body is formed with a bushing portion between said bore and an adjacent axial end face of said body, and a contact coil electrically connected to said heating wire is arranged in said bushing portion.

* * * * *